J. CROMWELL.
COFFEE-POT.
No. 185,730.
Patented Dec. 26, 1876.
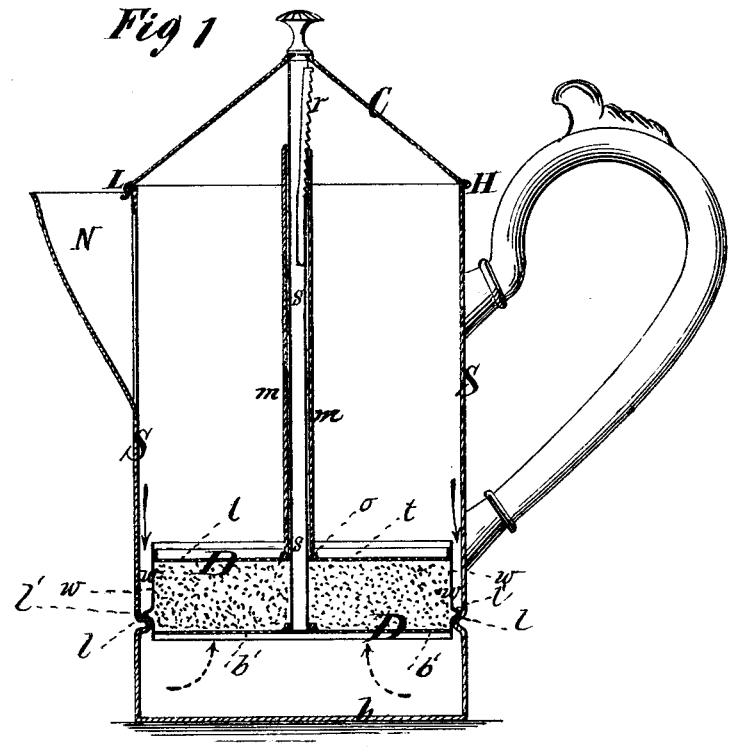
Witnesses:
Michael Ryan
Fred. Haynes
John Cromwell.
by his Attorneys
Brown & Allen.
THE GRAPHIC CO. N.Y.

UNITED STATES PATENT OFFICE.

JOHN CROMWELL, OF CRANFORD, NEW JERSEY.

IMPROVEMENT IN COFFEE-POTS.

Specification forming part of Letters Patent No. 185,730, dated December 26, 1876; application filed February 9, 1876.

*To all whom it may concern:*

Be it known that I, JOHN CROMWELL, of Cranford, in the county of Union and State of New Jersey, have invented a new and useful Improvement in Pots or Vessels for Boiling Coffee or extracting the soluble portions of other organic substances by the use of boiling liquids; and I do hereby declare that the following is a full, clear, and exact description of the same, reference being had to the accompanying drawing, which forms part of this specification.

My invention is primarily designed for the extraction of the virtues of coffee by boiling water, but it may be advantageously applied to making extracts from other vegetable substances.

The invention consists in a hollow diaphragm used in a pot or vessel to contain the material to be treated by the heated liquid, and said diaphragm being perforated or reticulated, arranged and held by suitable mechanism below the spout of such pot or vessel, for separating the liquid into portions, the lower of which boils first, and, extracting the more volatile ingredients from the material acted upon by the liquid, yields up such volatile ingredients to the upper and cooler portion of the liquid, in which they condense and are saved, instead of being expelled by the heat and wasted, while the less volatile and not so easily extracted ingredients are dissolved. It also consists in means whereby the disk forming the top of the hollow diaphragm is held down upon the substance in said hollow diaphragm, to keep such substance sufficiently compact during the action of the heated liquid upon it. It also consists in means whereby the hollow diaphragm is held firmly in its proper position to prevent its being forced upward by the pressure of steam or vapor generated underneath it, thus compelling the steam or vapor and boiling liquid below the hollow diaphragm to pass through the reticulated bottom and top of the same, and through the substance held therein.

Figure 1 is a central vertical section of my improved pot or vessel. Fig. 2 is an enlarged sectional detail of the same.

Similar letters refer to like parts in both figures.

S is the body of the pot or vessel, provided with a cover, C, preferably of conical form, and hinged to said shell at H, and provided with a spring-catch, L. At some distance from the bottom $b$ of the pot or vessel, but below the spout N, is formed, by grooving the shell S on the exterior, or otherwise, an internal ledge, $l$, which supports the hollow diaphragm D below the spout N when the vessel is in use. The said hollow diaphragm D consists of a box, $w$, preferably shaped to conform measurably to the horizontal cross-section of the pot or vessel, and having preferably an exterior bead, $l'$, formed by grooving the interior of said wall $w$, or otherwise, the said bead $l'$ resting upon the ledge $l$, and thus supporting the said hollow diaphragm; but the said hollow diaphragm may be otherwise supported. The said box $w$ has a perforated or reticulated bottom, $b'$, to permit the passage of liquid and steam or vapor. The disk $t$, which forms the top of the said hollow diaphragm D, is also reticulated or perforated, and is removable. It is held in place, when in use, in the following manner: To the bottom $b'$ of the hollow diaphragm D is attached a spindle, $s$, which rises from said bottom $b$ to the interior apex of the cover C when the latter is closed. To the upper portion of said spindle $s$ is attached a spring-ratchet, $r$. The disk $t$, forming the top of the hollow diaphragm D, has a hole, $o$, and hollow spindle or sleeve $m$, to permit the passage of the spindle $s$, and the upper end of this sleeve reaches to and engages the spring-ratchet $r$ when in place, to hold a charge of material in the hollow diaphragm D. When it is desired to remove the disk $t$ of the said hollow diaphragm D, the spring-ratchet $r$ is pressed toward the vertical axis of the spindle $s$, which allows the upper end of the sleeve $m$ to pass freely.

When in use, the coffee, or other substance the virtues of which are to be extracted, is placed in the hollow diaphragm D, and the disk $t$ is placed in position, as shown in Fig. 1, and hereinbefore described, said disk $t$ being held in place down upon the contents of the hollow diaphragm D by the engagement of the top of the sleeve $m$ with the spring-ratchet $r$. The hollow diaphragm is then placed in the pot or vessel, as hereinbefore described, and is firmly held in place by the abutment of the upper end of the spindle s against the inner apex of the cover C, as shown in Fig. 1, the said cover C, when closed, being prevented from opening by the spring-catch L, or by any other suitable means.

After charging and placing the hollow diaphragm as described, the extracting liquid is placed in the pot in quantity sufficient to rise above the said hollow diaphragm and its contents. Heat is now applied to the bottom b of the pot or vessel; but as free circulation of the liquid between the spaces below and above the said hollow diaphragm is prevented by the interposition of the said hollow diaphragm and its contents, the lower portion of said liquid will boil first, and, acting upon the substance contained in the said hollow diaphragm, will extract the soluble ingredients thereof, such volatile ingredients as the heat first expels from the liquid below being condensed in the upper and cooler portion of said liquid, instead of being totally expelled by heat, as would be the case did the whole of the liquid boil simultaneously. After a while the steam and heated liquid from below will circulate through the said hollow diaphragm and its contents sufficiently to boil the liquid in the upper part of the pot. As soon as this takes place it will be advisable to remove the pot to a cooler place, as further boiling would expel the more volatile ingredients, which, in the earlier part of the process, condense in the upper portion of the liquid.

The spindle s serves as a handle for removing the hollow diaphragm D after the process of extraction is completed.

The placing of the hollow diaphragm D below the spout N of the pot or vessel secures two important advantages. If the said diaphragm were placed above the said spout, or above the outlet of the pot, the obstruction it offers to the passage of steam would cause the pressure of the steam to eject the fluid below the said diaphragm from the spout or open outlet. In my arrangement this accident cannot occur. A second advantage is, that in my arrangement the more volatile parts of the infusion or decoction are poured first from the spout when the liquid is required for use. On the contrary, in pots where the diaphragm is placed above the spout, the heavier, less volatile, and less wholesome parts, from which the more volatile portions have been driven through the said diaphragm into the upper stratum of liquid, are first poured out.

I claim—

1. The combination, with the pot or vessel, of the hollow perforated or reticulated containing-diaphragm, arranged and held below the spout N or outlet-opening of the pot or vessel, substantially as and for the purpose specified.

2. The combination of the upper disk t of the hollow diaphragm D, the sleeve m, the spring-ratchet r, and the spindle s, attached to the bottom of said hollow diaphragm, substantially as described.

3. The hollow diaphragm D and its spindle s, in combination with the cover C and ledge l of the pot, substantially as herein set forth.

JOHN CROMWELL.

Witnesses:
MICHAEL RYAN,
FRED. HAYNES.